US008811781B2

(12) United States Patent
Kusuura

(10) Patent No.: US 8,811,781 B2
(45) Date of Patent: Aug. 19, 2014

(54) SHADING SYSTEM USING LIQUID LENS AND LIGHT WAVEGUIDE

(75) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 230 days.

(21) Appl. No.: 13/143,096

(22) PCT Filed: Mar. 9, 2011

(86) PCT No.: PCT/US2011/027654
§ 371 (c)(1),
(2), (4) Date: Jul. 1, 2011

(87) PCT Pub. No.: WO2012/121715
PCT Pub. Date: Sep. 13, 2012

(65) Prior Publication Data
US 2012/0230633 A1    Sep. 13, 2012

(51) Int. Cl.
*G02B 6/32* (2006.01)
*F24J 2/08* (2006.01)
*F24J 2/46* (2006.01)
*H02N 6/00* (2006.01)
*H01L 31/042* (2014.01)

(52) U.S. Cl.
USPC .............. 385/33; 126/698; 126/704; 136/246

(58) Field of Classification Search
USPC .................... 385/33; 126/698, 700, 704, 708; 136/244, 246
See application file for complete search history.

(56) References Cited

U.S. PATENT DOCUMENTS

| 4,511,755 A * | 4/1985 | Mori ............................. 136/246 |
| 5,581,447 A * | 12/1996 | Raasakka ...................... 362/557 |
| 6,730,840 B2 * | 5/2004 | Sasaoka et al. ............... 136/246 |
| 7,813,061 B2 * | 10/2010 | Steneby ........................ 359/811 |

(Continued)

FOREIGN PATENT DOCUMENTS

| JP | 2001174656 A | 6/2001 |
| JP | 2005164631 A | 6/2005 |
| WO | 03069380 A1 | 8/2003 |

OTHER PUBLICATIONS

Polymer Optical Waveguide, retrieved Jun. 29, 2011. <http://www.ntt-at.com/product/waveguide/>.

(Continued)

*Primary Examiner* — Ryan Lepisto
*Assistant Examiner* — Robert Tavlykaev
(74) *Attorney, Agent, or Firm* — Maschoff Brennan

(57) ABSTRACT

Techniques described herein generally relate to assemblies with selective optical transmissivity. In some examples, an assembly with selective optical transmissivity is described. The assembly can include a first layer and a second layer. The first layer can include a multiple number of liquid lens units. Each of the liquid lens units can be configured to selectively focus incoming optical rays within a focal range defined between a first focal length and a second focal length. The second layer can be spaced apart from the first layer and can include a multiple number of optical waveguides. Each of the optical waveguides can include one or more waveguide inlets such that the second layer includes a multiple number of waveguide inlets. Each of the waveguide inlets may be associated with a respective one of the liquid lens units and may be spaced apart from the respective one of the liquid lens units by a distance within the focal range.

31 Claims, 9 Drawing Sheets

(56) References Cited

U.S. PATENT DOCUMENTS

| | | | |
|---|---|---|---|
| 7,946,286 B2* | 5/2011 | Raymond et al. | 126/678 |
| 8,491,138 B2* | 7/2013 | O | 359/855 |
| 2003/0147261 A1* | 8/2003 | Babbitt et al. | 362/582 |
| 2005/0100270 A1 | 5/2005 | O'Connor et al. | |
| 2005/0224074 A1* | 10/2005 | Steneby | 126/698 |
| 2007/0247724 A1 | 10/2007 | Jung | |
| 2008/0202703 A1 | 8/2008 | Edmonds | |
| 2009/0296408 A1 | 12/2009 | Hendriks et al. | |
| 2010/0014173 A1 | 1/2010 | Moyer | |
| 2010/0116319 A1* | 5/2010 | Martinez Anton et al. | 136/246 |

OTHER PUBLICATIONS

Wikipedia, Waveguide (Optics) retrieved Jun. 29, 2011. <http://en.wikipedia.org/wiki/Waveguide_(optics)>.

Selkowitz, S.; Lee, Eleanor, Integrating Automated Shading and Smart Glazings with Daylight Controls, Published Feb. 13, 2004 Lawrence Berkeley National Laboratory.<http://escholarship.org/uc/item/5mq2p25x>.

Chronis, N; Liu, G; Jeong, K; Lee, L; "Tunable liquid-filled microlens array integrated with microfluidic network" Optics Express, vol. 11, Issue 19, pp. 2370-2378 (2003).

Jacobsen, H; Hell, S; "Effect of the specimen refractive index on the imaging of a confocal fluorescence microscope employing high aperture oil immersion lenses" University of Turku, Department of Medical Physics, Turku Finland. Accepted Jan. 11, 1995.

Berge, B; Peseux, P. "Variable focal lens controlled by an external voltage: An application of electrowetting" The European Physical Journal E: Soft Matter and Biological Physics vol. 3, No. 2, 159-163, DOI: 10.1007/s101890070029.

Kuiper, S., & Hendriks, B. H. W. (2004). Variable-focus liquid lens for miniature cameras. Applied Physics Letters, 85 (7), 1128. Retrieved from http://link.aip.org/link/APPLAB/v85/i7/p1128/s1&Agg=doi.

"Autofocus & Optical Image Stabilization," accessed at http://web.archive.org/web/20110117190127/http://www.varioptic.com/en/tech/technology-autofocus-optical-image-stabilization.php, accessed on Feb. 6, 2014, pp. 1-2.

"Drive 4.4 of a liquid crystal cell," accessed at http://web.archive.org/web/20090428175555/http://www.jpo.go.jp/shiryou/s_sonota/map/denki07/4/4-4.htm, accessed on Feb. 6, 2014, pp. 1-3.

"Film-shaped optical waveguide," accessed at http://web.archive.org/web/20061231134111/http://techon.nikkeibp.co.jp/board/word/wgfilm.html, accessed on Feb. 7, 2014, pp. 1-2.

"Image sensor," Keyence, accessed at http://www.keyence.co.jp/gazo/etc_gazo/etc_gazo/ca_s2040, accessed on Feb. 7, 2014, pp. 1-2.

"Polymer Optical Waveguide," NTTAT, accessed at http://web.archive.org/web/20081203150131/http://www.ntt-at.com/products_e/Waveguide/index.html, accessed on Feb. 7, 2014, pp. 1-2.

"Successful high-speed drawing of fine wiring in laser-assisted inkjet method," accessed at http://web.archive.org/web/20090702082811/http://www.aist.go.jp/aist_j/press_release/pr2009/pr20090629/pr20090629.html, accessed on Feb. 7, 2014, pp. 1-6.

"Types of OLEDs: Passive and Active Matrix," Oefan, accessed at http://web.archive.org/web/20100718200201/http://www.oefan.com/Paraphrase/shi1/200711/2228.html, accessed on Feb. 7, 2014, pp. 1-4.

"Waveguide (optics)," Wikipedia, accessed at http://web.archive.org/web/20110116200105/http://en.wikipedia.org/wiki/Waveguide_(optics), accessed on Feb. 7, 2014, pp. 1-5.

Smith, N.R., et al., "Fabrication and Demonstration of Electrowetting Liquid Lens Arrays," Journal of Display Technology, vol. 5, Issue 11, pp. 411-413 (2009).

* cited by examiner

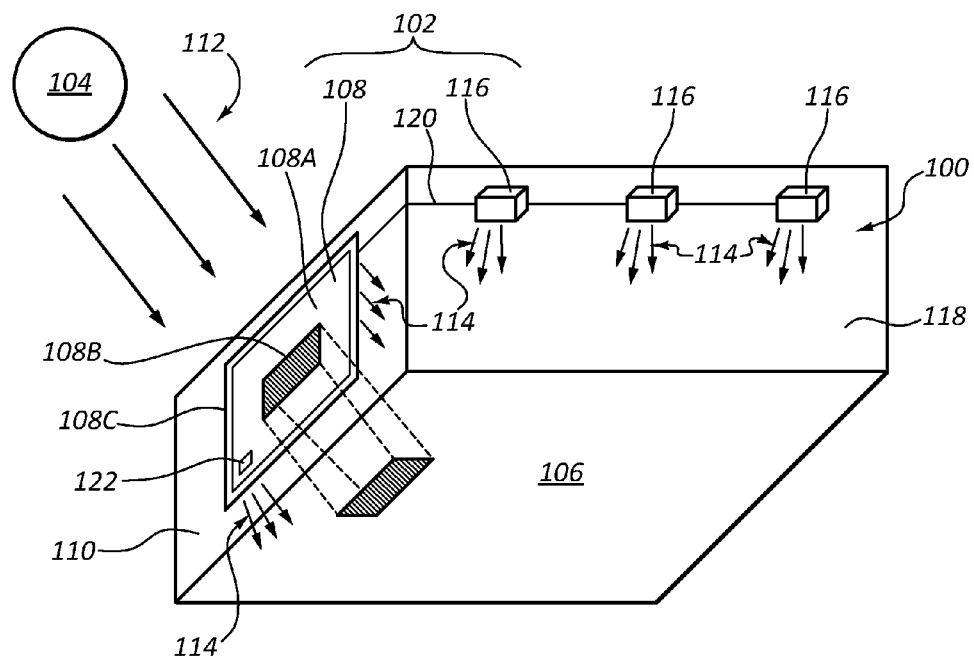
FIG. 1
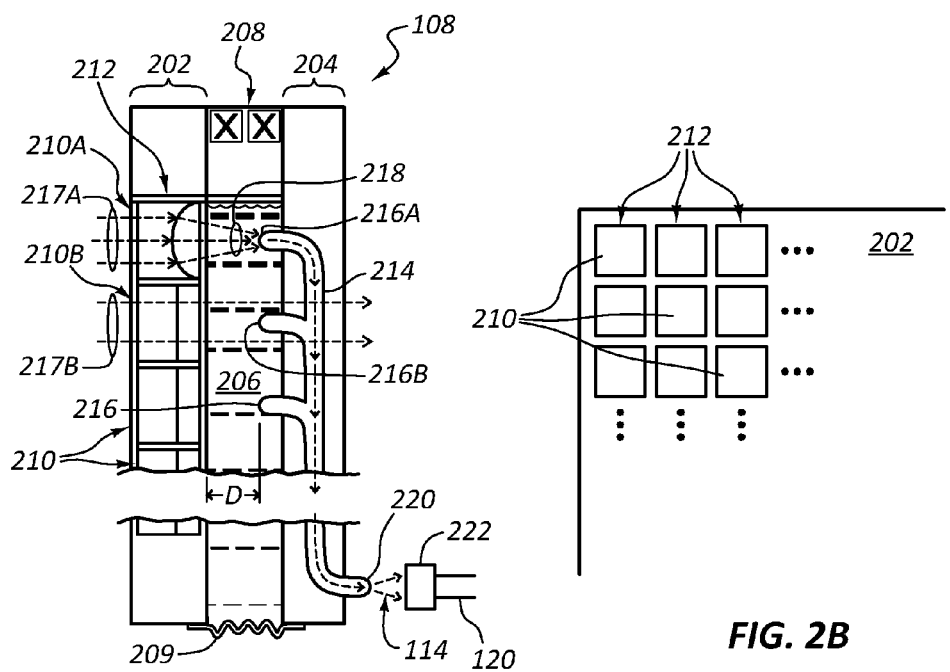
FIG. 2A
FIG. 2B

SHADING SYSTEM USING LIQUID LENS AND LIGHT WAVEGUIDE

BACKGROUND

Unless otherwise indicated herein, the materials described herein are not prior art to the claims in the present application and are not admitted to be prior art by inclusion in this section.

Natural lighting, e.g., light from the sun, is sometimes used for illuminating rooms in buildings, houses, and other structures. Although natural lighting may adequately illuminate a room, the natural lighting may interfere with use of the room due to an incoming angle or intensity of the natural light. For example, the natural lighting may create glare on a computer monitor in the room or may shine in a person's eyes as a result of its incoming angle and/or intensity.

As a result, light-control devices are often used to block natural lighting. Such light-control devices may include window blinds and curtains, for instance, and may include one or more non-transmissive portions that block natural lighting from entering a room. The blocked lighting may be reflected or converted to heat but does not generally illuminate the room, even if illumination is desired. Consequently, interior lights may be used together with light-control devices to provide adequate illumination in a room when natural lighting is blocked.

SUMMARY

Techniques described herein generally relate to assemblies with selective optical transmissivity.

In some examples, an assembly with selective optical transmissivity is described. The assembly can include a first layer and a second layer. The first layer can include a multiple number of liquid lens units. Each of the liquid lens units can be configured to selectively focus incoming optical rays within a focal range defined between a first focal length and a second focal length. The second layer can be spaced apart from the first layer and can include a multiple number of optical waveguides. Each of the optical waveguides can include one or more waveguide inlets such that the second layer includes a multiple number of waveguide inlets. Each of the waveguide inlets may be associated with a respective one of the liquid lens units and spaced apart from the respective one of the liquid lens units by a distance within the focal range.

In some examples, an assembly with selective optical transmissivity is described. The assembly can include a first layer, a second layer and a buffer layer. The first layer can include an array of liquid lens units. The second layer can be spaced apart from the first layer and can include a multiple number of optical waveguides. Each of the optical waveguides can include one or more waveguide inlets such that the second layer includes a multiple number of waveguide inlets. Each of the waveguide inlets may be associated with a respective liquid lens unit included in the array of liquid lens units. The buffer layer can be positioned between the first and second layers.

In some examples, a method of operating an assembly with selective optical transmissivity is described. The method can include receiving a multiple number of incoming optical rays at the assembly. The method can also include transmitting a first portion of the incoming optical rays received by a first portion of the assembly through the first portion of the assembly to illuminate a first portion of an interior space. The method can also include at least partially blocking a second portion of the incoming optical rays received by a second portion of the assembly from illuminating a second portion of the interior space. The method can also include redirecting the blocked second portion of the incoming optical rays received by the second portion of the assembly to illuminate a third portion of the interior space.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 1 is a block diagram of an example operating environment in which a shading system can be implemented;

FIG. 2A is a cross-sectional view of an assembly included in the shading system of FIG. 1;

FIG. 2B is a front view of a first layer included in the assembly of FIG. 2A;

DETAILED DESCRIPTION

Figure 3:
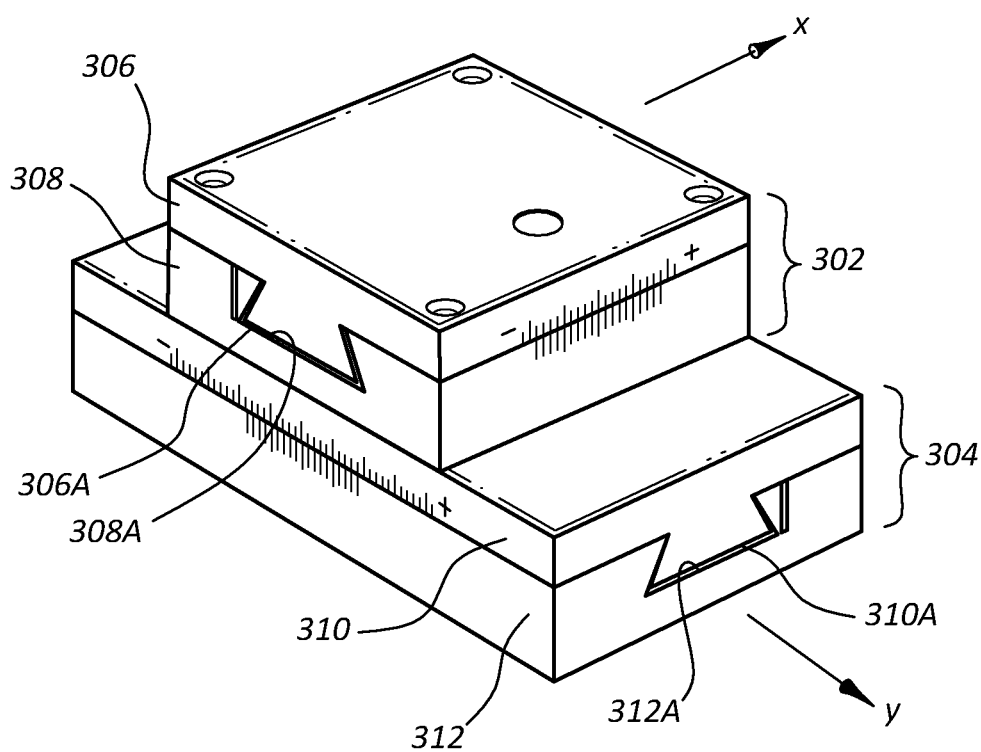
FIG. 3 is a perspective view of an illustrative embodiment of an XY stage included in the assembly of FIG. 2A.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments disclosed herein generally relate to assemblies with selective optical transmissivity that can be implemented to control lighting in a room or other interior space. An example assembly can include a first layer and a second layer. The first layer can include multiple liquid lens units that are each configured to selectively focus incoming optical rays within a focal range defined between a first focal length and a second focal length. The liquid lens units may be independently controlled.

The second layer can be spaced apart from the first layer and can include multiple optical waveguides. Each of the optical waveguides can include multiple waveguide inlets. Each of the waveguide inlets may be spaced apart from a respective one of the liquid lens units by a distance within the focal range. Incoming light can be blocked from entering the room by controlling one or more liquid lens units to focus incoming optical rays on one or more corresponding waveguide inlets. For instance, the assembly may include a control module configured to independently control the liquid lens units. The focused optical rays can be received through the one or more waveguide inlets into one or more corresponding optical waveguides as redirected optical rays.

Each of the optical waveguides can include at least one waveguide outlet. The waveguide outlets can be configured to output redirected optical rays into the room in such a manner as to provide illumination without interfering with use of the room. For example, the redirected optical rays may be output into the room from a particular location and/or at a particular angle that does not interfere with use of the room.

The assembly can be implemented in a shading system that can additionally include one or more optical ray output devices. The optical ray output devices may be coupled to the optical waveguides of the second layer through one or more optical fibers and/or fiber couplers. For instance, an optical ray output device may be positioned in a ceiling of the room and may be configured to diffusely output redirected optical rays into the room from the ceiling.

One skilled in the art will appreciate, with the benefit of the present disclosure, that some embodiments of the assembly and/or shading system disclosed herein permit light to be controlled on a highly granular basis to create shade in specific regions of a room or other interior space. Thus, incoming light may enter and provide lighting for regions of the room where the incoming light does not interfere with use of the room, while other regions of the room where incoming light might interfere with use of the room can be shaded. For instance, if incoming light would create glare on a computer monitor or other display, the computer monitor or other display can be shaded from the incoming light while allowing the incoming light to illuminate other regions of the room. Alternately or additionally, incoming light that is blocked from illuminating a particular region of the room may be redirected to enter the room from another direction or location, thereby illuminating the room without interfering with the use of the room.

FIG. 1 shows a diagram of an example operating environment 100 in which a shading system 102 can be implemented in accordance with at least some embodiments described herein. In the illustrated embodiment, a portion of the shading system 102 may be interposed between a light source 104, such as the sun, and an interior space 106 of the operating environment 100. The operating environment 100 may include a room in a house, a building, or other structure in some embodiments.

The portion of the shading system 102 interposed between the light source 104 and the interior space 106 may include an assembly 108 set in a wall 110 and implemented as a window. Generally, the assembly 108 may be configured, e.g., by a control module or other computing device, to selectively transmit or block incoming optical rays 112. In the illustrated embodiment of FIG. 1, for instance, the assembly 108 may be configured to selectively transmit a first portion of the incoming optical rays 112 received by a first portion 108A of the assembly 108 into the interior space 106, and to selectively block at least a second portion of incoming optical rays 112 received by a second portion 108B of the assembly 108.

Optionally, incoming optical rays 112 that are blocked from entering the interior space 106 through the assembly 108 may be redirected and enter the interior space 106 as redirected optical rays 114 from a different direction than the incoming optical rays 112. For instance, some of the incoming optical rays 112 may be redirected from the second portion 108B of the window 108 to enter the interior space 106 through a frame 108C of the assembly 108 as redirected optical rays 114. Alternately or additionally, some of the incoming optical rays 112 may be redirected through one or more optical ray output devices 116 set in a ceiling (not shown) or wall 118 to enter the interior space 106 as redirected optical rays 114.

In these and other embodiments, the shading system 102 may further include one or more optical fibers 120 configured to optically couple the frame 108C and/or optical ray output devices 116 to the assembly 108. Alternately or additionally, the shading system 102 may further include one or more optical switches (not shown) 20 configured to control output of the redirected optical rays 114 through particular ones of the optical ray output devices 116.

Each of the optical ray output devices 116 may include a light guide configured to diffusely output the redirected optical rays 114. Such light guides may each include a substantially planar structure and may be coated on one side by a reflective film including gold, silver, or aluminum plating, for instance.

In some embodiments, the shading system 102 may further include or be coupled to a control module 122. The control module 122 may generally be configured to control optical transmissivity of the assembly 108. In some embodiments, for instance, the control module 122 may be configured to independently control one or more liquid lens units included in the assembly 108 by independently controlling a focal length of each of the liquid lens units, as will be described in greater detail below.

FIG. 2A shows a cross-sectional view of an illustrative embodiment of the assembly 108 included in the shading system 102 of FIG. 1 that is arranged in accordance with at least some embodiments described herein. The assembly 108 may include, for instance a first layer 202, and a second layer 204 spaced apart from the first layer. The first and second layers 202, 204 may be configured in a substantially parallel orientation with respect to one another. Alternately or additionally, the assembly 108 may further include a buffer layer 206, an XY stage 208 and/or a seal member 209.

FIG. 2B shows a front view of an illustrative embodiment of the first layer 202 included in the assembly 108 of FIG. 2A that is arranged in accordance with at least some embodiments described herein. With combined reference to FIGS. 2A and 2B, the first layer 202 may include a multiple number of liquid lens units 210, including liquid lens unit 210A and liquid lens unit 210B. The liquid lens units 210 may be arranged in an array including a multiple number of columns 212 (only one column 212 is visible in FIG. 2A).

Each of the liquid lens units 210 may be configured, e.g., by control module 122 (FIG. 1), to selectively focus incoming optical rays 112 within a focal range defined between a minimum focal length $f_{min}$ and a maximum focal length $f_{max}$. The minimum focal length $f_{min}$ may be less than about 20 millimeters ("mm"), or less than about 5 mm, or less than about 1 mm. The maximum focal length $f_{max}$ may be more than about 40 mm, or more than about 100 mm, or about infinity. Alternately or additionally, the maximum focal length $f_{max}$ may be a negative focal length.

In the illustrated embodiment, the liquid lens unit 210A may be configured with a focus at a first focal length $f_1$ within the focal range $f_{min}$-$f_{max}$ such that a first set 217A of incoming optical rays 217 transmitted through the liquid lens unit 210A may be focused on the second layer 204 as focused optical rays 218. The liquid lens unit 210B may be configured with a focus at a second focal length $f_2$ of about infinity such that a second set 217B of incoming optical rays 217 transmitted through the liquid lens unit 210B are substantially unaffected by transmission through the liquid lens unit 210B.

The second layer 204 may include a multiple number of optical waveguides 214 (only one optical waveguide 214 is visible in FIG. 2A). Each of the optical waveguides 214 may include a multiple number of waveguide inlets 216, including waveguide inlets 216A and 216B. Each of the waveguide inlets 216 may be associated with a respective liquid lens unit 210 and may be spaced apart from the respective liquid lens unit 210 by a distance D within the focal range $f_{min}$-$f_{max}$. For example, the waveguide inlets 216A, 216B may be respectively spaced apart from liquid lens units 210A, 210B by the distance D. The distance D may be in a range from between about 10 mm to about 20 mm, or between about 5 mm to about 40 mm or between about 1 mm to about 100 mm.

Each of the optical waveguides 214 may be aligned with a respective column 212 of liquid lens units 210. In some embodiments, as explained in greater detail below, each of the optical waveguides 214, except for waveguide inlets 216, may be coated with a plating film. In these and other embodiments, a diameter of each of the optical waveguides 214 may be less than about thirty percent, or less than about ten percent, or less than about five percent, of a width of a corresponding column 212 of liquid lens units 210. Alternately or additionally, a diameter of each of the optical waveguides 214 may be less than about 50 micrometers ("μm"), or less than about 10 μm, or less than about 5 μm.

In other embodiments, a plating film may be omitted from coating the optical waveguides 214. Accordingly, the waveguides 214 may be substantially transparent to incoming optical rays 217 that are incident on the waveguides 214 other than at the waveguide inlets 216. In these and other embodiments, a diameter of each of the optical waveguides 214 may be as much as about 100% or more of the width of a corresponding column 212 of liquid lens units 210.

Each of the waveguide inlets 216 may be configured to receive incoming optical rays 112 focused by a respective one of the liquid lens units 210. For instance, the waveguide inlet 216A may be adapted to receive the focused optical rays 218. Alternately or additionally, the waveguide inlet 216A may be adapted to direct the focused optical rays 218 into the optical waveguide 214.

In contrast, the second set 112B of optical rays 112 that are unfocused by the liquid lens unit 210B may be substantially transmitted through the second layer 204. In some embodiments, however, one or more optical rays 112 of the unfocused second set 112B may be incident on the waveguide inlet 216B such that they may be received by the waveguide inlet 216B and directed into the optical waveguide 214.

More generally, it will be appreciated, with the benefit of the present disclosure, that each of the waveguide inlets 216 may be adapted to receive and direct into the optical waveguide 214 a relatively greater or lesser percentage of the optical rays 112 transmitted through respective liquid lens units 210 depending on the respective focal lengths of the liquid lens units 210. For example, a waveguide inlet 216 may be configured to receive substantially all of the optical rays 112 transmitted through a liquid lens unit 210 with a focal length $f_1$ equal to about D. Alternately or additionally, a waveguide inlet 216 may be configured to receive substantially none of the optical rays 112 transmitted through a liquid lens unit 210 with a focal length $f_2$ equal to about infinity. Alternately or additionally, a waveguide inlet 216 may be adapted to receive a portion of the optical rays 112 transmitted through a liquid lens unit 210 with a focal length $f_3$ greater than about D and less than about $f_2$.

In the illustrated embodiment of FIG. 2A, the buffer layer 206 may be positioned between the first and second layer 202, 204. The buffer layer 206 may include one or more of water, silicon oil, paraffin oil, hydrocarbon liquid, fluorinated hydrocarbon, and/or the like. An index of refraction of the buffer layer 206 may be in a range between about 1.25 and about 1.5, such as about 1.3, 1.4, or 1.48. Alternately or additionally, the index of refraction of the buffer layer 206 may be in a range between about 1.25 and about 1.3, about 1.4 or about 1.5.

More generally, the index of refraction of the buffer layer 206 may be between an index of refraction of the liquid lens units 210 and an index of refraction of the optical waveguides 214. In other embodiments, the index of refraction of the buffer layer 206 may be less than about 10% higher than the index of refraction of the liquid lens units 210, or the index of refraction of the optical waveguides 214, whichever is higher. In yet other embodiments, the index of refraction of the buffer layer 206 may be less than about 10% lower than the index of refraction of the liquid lens units 210, or the index of refraction of the optical waveguides 214, whichever is lower.

Each optical waveguide 214 may include a waveguide outlet 220 configured to output redirected optical rays 114 that have been directed through respective optical waveguides 214. While the waveguide outlets 220 are illustrated in FIG. 2A as being positioned at the bottom of the assembly 108, in other embodiments the waveguide outlets 220 may be positioned at the top, sides, or other areas of the assembly 108.

With combined reference to FIGS. 1-2A, the waveguide outlets 220 may be configured to output the redirected optical rays 114 directly into the interior space 106. Thus, the optical ray output devices 116 of FIG. 1 may include the waveguide outlets 220. Alternately or additionally, the waveguide outlets 220 may be optically coupled to one or more optical ray output devices 116 set in a ceiling or wall 118 or frame 108C of the assembly 108. In these and other embodiments, each of the waveguide outlets 220 may be optically coupled to the one or more optical ray output devices 116 via an optical fiber coupler 222 and an optical fiber 120.

The XY stage 208 may be coupled between the first and second layers 202, 204. The XY stage 208 may be configured to maintain a predetermined spacing, e.g., the distance D, between the first layer 202 and the second layer 204. Alternately or additionally, the XY stage 208 may be configured to adjust an alignment of one of the first layer 202 or the second layer 204 relative to the other of the second layer 204 or the first layer 202. The relative alignment between the first and second layers 202, 204 may be adjusted, e.g., periodically, to accommodate changes in an angle of incidence of incoming optical rays 112 arising from relative movement between the source 104 (FIG. 1) of the incoming optical rays 112 and the assembly 108.

FIG. 3 shows a perspective view of an illustrative embodiment of the XY stage 208 included in the assembly 108 of FIG. 2A that is arranged in accordance with at least some embodiments described herein. The XY stage 208 may include first and second linear motion assemblies 302, 304 coupled together. Alternately or additionally, the XY stage may be motorized.

The first linear motion assembly 302 may include a first plate 306 with a dovetail ridge 306A formed thereon and a second plate 308 with a complementary dovetail channel 308A formed therein. The dovetail ridge 306A may be configured to slidably engage the dovetail channel 308A and may cooperate with the dovetail channel 308A to define a first degree of freedom in the arbitrarily-defined X direction.

The second linear motion assembly 302 may include a third plate 310 with a dovetail ridge 310A formed thereon and a fourth plate 312 with a complementary dovetail channel 312A formed therein. The dovetail ridge 310A may be configured to slidably engage the dovetail channel 312A and may cooperate with the dovetail channel 312A to define a second degree of freedom in the arbitrarily-defined Y direction. The first and second linear motion assemblies 302, 304 may be coupled together such that the first and second degrees of freedom, e.g., the X and Y directions, are orthogonal.

With combined reference to FIGS. 2-3, the first linear motion assembly 302 may be coupled to the first layer 202, while the second linear motion assembly 304 may be coupled to the second layer 204. If a position of the first layer 202 is fixed, an alignment of the second layer 204 can be adjusted relative to the first layer 202 by moving the fourth plate 312 in the Y direction relative to the third plate 310 and/or by moving the second plate 308 in the X direction relative to the first plate 306. Alternately, the position of the second layer 204 may be fixed while the alignment of the first layer 202 may be adjustable relative to the second layer 204.

The seal member 209 may be configured to span the gap between the first and second layers 202, 204 and may be coupled to the first and second layers 202, 204. Alternately or additionally, the seal member 209 may be configured to cooperate with the first layer 202, second layer 204 and XY stage 208 to confine the buffer layer 206 between the first and second layers 202, 204. The seal member 209 may include a flexible bellows-type seal or may have another suitable configuration to accommodate alignment adjustments between the first and second layers 202, 204.

Figure 4A:
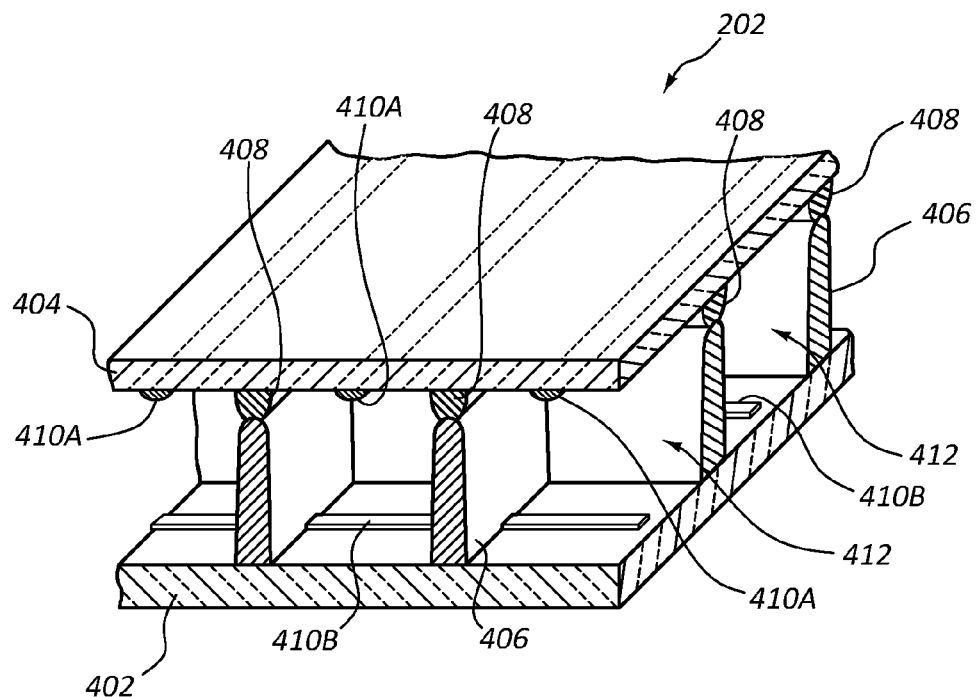
FIGS. 4A-4B are a double-cross-sectional perspective view and a cross-sectional side view of an illustrative embodiment of the first layer included in the assembly of FIG. 2A.
Figure 4B:
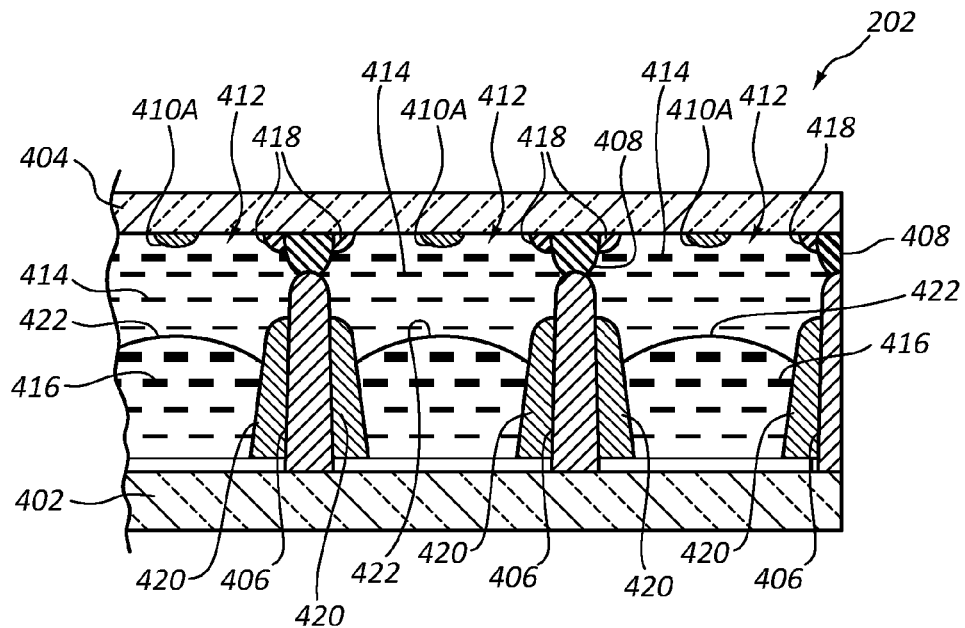

FIGS. 4A and 4B show a double cross-sectional perspective view and a cross-sectional side view of an illustrative embodiment of the first layer 202 included in the assembly 108 of FIG. 2A that is arranged in accordance with at least some embodiments described herein. With combined reference to FIGS. 4A-4B, the first layer 202 may include a first film 402, a second film 404 spaced apart from the first film 402, a multiple number of barriers 406, a sealant 408, and/or a multiple number of elongated electrodes 410A, 410B.

Each of the first and second films 402, 404 may be substantially transparent to optical rays having wavelengths within one or more predetermined wavelength ranges. For example, each of the first and second films 402, 404 may have an optical transmittance of greater than about 85%, or greater than about 90%, or greater than about 95% with respect to at least the predetermined wavelength range. The predetermined wavelength range may include the visible spectrum, e.g., about 380 nanometers ("nm") to about 750 nm. Alternately or additionally, the predetermined wavelength range may include a subrange of the visible spectrum. Moreover, each of the first and second films 402, 404 may include one or more of glass, poly(methyl methacrylate), acrylic resin, polycarbonate, fluorocarbon polymers, Cycloc Olefin Copolymer ("COC"), or other suitable optically transparent material(s).

The barriers 406 may be adapted to extend from the first film 402 into a region between the first and second films 402, 404. Further, the barriers 406 may define a multiple number of individual cells 412 corresponding to the liquid lens units 210 (FIGS. 2A-2B). In some embodiments, the barriers 406 may include one or more of silicone rubber, polyurethane rubber, isobutylene-isoprene rubber, acrylic resin, epoxy resin, polyurethane resin, or other suitable material(s).

The sealant 408 may be positioned to form a seal between the barriers 406 and the second film 404. For example, the sealant 408 may be positioned in mutual contact with the barriers 406 and the second film 404. Further, the sealant 408 may be configured to cooperate with the first and second films 402, 404 and barriers 406 to confine one or more fluids within each of the individual cells 412. The sealant 408 may include one or more of ultraviolet ("UV") thermosetting epoxy resin, UV thermosetting acrylic resin, thermosetting silicone resin, mixture-setting silicone resin, or other suitable sealant(s).

The elongated electrodes 410A, 410B may include a first subset of elongated electrodes 410A positioned on the first film 402, and a second subset of elongated electrodes 410B positioned on the second film 404. The second subset of elongated electrodes 410B may be aligned orthogonally to the first subset of elongated electrodes 410A. Moreover, each of the elongated electrodes 410A, 410B may include one or more of indium tin oxide, zinc oxide, aluminum zinc oxide, strontium oxide, silver, gold, copper, aluminum, beryllium, magnesium, sodium, calcium, zinc, molybdenum, tungsten, iridium, rhodium, potassium, nickel, chromium, cobalt, osmium, lithium, iron, polyaniline, polythiophene, polyacetylene, polyphenylene, polypyrrole, carbon nanotubes, fullerene, diamond-like carbon, or other suitable material(s). According to some embodiments, a voltage can be applied across one or more of the first subset of elongated electrodes 410A and one or more of the second subset of elongated electrodes 410B to actuate one or more individual cells 212 that correspond to an intersection between the respective ones of the electrodes 410A and 410B.

Optionally, the first layer 202 may further include one or more additional components that have been omitted from FIG. 4A to avoid obscuring aspects of some of the components depicted in FIG. 4A according to some embodiments. For example, as illustrated in FIG. 4B, the first layer 202 may further include, within each of the individual cells 412, a liquid solution 414, oil 416, upper electrode 418, and lower electrode 420.

The liquid solution 414 and oil 416 within each individual cell 412 may be configured in cooperation to focus, at a given focal length within the focal range $f_{min}$ to $f_{max}$, optical rays transmitted through a corresponding individual cell 412 depending on a voltage applied across the corresponding individual cell 412. In some embodiments, the liquid solution 414 may have an index of refraction that may be lower than an index of refraction of the oil 416 and the liquid solution 414 and oil 416 may have substantially equal densities. Alternately or additionally, the liquid solution 414 may be electrically conducting, while the oil 416 may be electrically insulating.

The liquid solution 414 may include an aqueous salt solution. The salt may include, but is not limited to, LiCl, $Na_2SO_4$, $Li_2SO_4$, NaCl, $CaCl_2$, $CaSO_4$, $MgCl_2$, $MgSO_4$, or other suitable salt(s).

The oil 416 may include, but is not limited to, phenylmethylsiloxanes, carbon tetrabromide, 1-bromo-dodecane, chloro-naphtalene, bromo-naphtalene, silicon oil, or other suitable oil(s). Optionally, the oil 416 may include one or more nano particles dissolved therein to configure the oil 416 with an index of refraction that is higher than an index of refraction of the liquid solution 414. The nano particles dissolved in the oil 416 may include, but are not limited to, $TiO_2$, $ZO_2$, $Al_2O_3$, $Nb_2O_5$, $SnO_2$, $Sb_2O_5$, ZnO, $SiO_2$, ITO, $La_2O_3$, $CeO_2$, $HfO_2$, Au, or Ag. Alternatively, a stable non-oil solution, such as a glycerol solution, with a refractive index higher than that of the liquid solution 414, may be used in place of the oil 416.

One or more surfaces within each individual cell 414 may be treated with water repellant to substantially confine the liquid solution 414 within the individual cell 414 to a particular region of the individual cell 414. For example, surfaces of each individual cell 414 in region(s) occupied by oil 416 may be treated with water repellant to repel the liquid solution 414 therefrom. Accordingly, the liquid solution 414 may be substantially confined to one region of each individual cell 414 while the oil 416 may be substantially confined to another region.

The liquid solution 414 and oil 416 within each individual cell 414 may meet at a surface boundary 422. In some embodiments, a shape of each surface boundary 422 may be adjusted at least between a substantially planar surface boundary (not shown) corresponding to an infinite focal length and a substantially light-converging surface boundary 422 as shown in FIG. 4B, depending on a voltage applied across the corresponding individual cell 414. The substantially light-converging surface boundary 422 depicted in FIG. 4B may correspond to a finite focal length, a magnitude of which depends on a degree of curvature of the surface boundary 422, and thus may depend on the voltage applied across the corresponding individual cell 414.

The upper electrode 418 within each individual cell 412 may be positioned on the second film 404 along a perimeter of each individual cell 412. The upper electrode 418 within each individual cell 412 may be arranged in electrical contact with the corresponding elongated electrode 410A passing through the individual cell 412. Analogously, the lower electrode 420 within each individual cell 412 may be positioned on the first film 402 along a perimeter of each individual cell 412. The lower electrode 420 within each individual cell 412 may be in electrical contact with the corresponding elongated electrode 410B passing through the individual cell 412. Each of the upper and lower electrodes 418, 420 may include one or more of indium tin oxide, zinc oxide, aluminum zinc oxide, strontium oxide, silver, gold, copper, aluminum, beryllium, magnesium, sodium, calcium, zinc, molybdenum, tungsten, iridium, rhodium, potassium, nickel, chromium, cobalt, osmium, lithium, iron, polyaniline, polythiophene, polyacetylene, polyphenylene, polypyrrole, carbon nanotubes, fullerene, diamond-like carbon, or other suitable material(s).

FIGS. 5A-5D depict a principle of operation of an illustrative embodiment of an individual cell 500 that may be included in the first layer 202 of FIGS. 4A-4B and that is arranged in accordance with at least some embodiments described herein. The individual cell 500 may correspond to the individual cells 412 of FIGS. 4A-4B. The individual cell 500 may include a first layer 502, second layer 504, barrier 506, sealant 508, elongated electrodes 510A, 510B, liquid solution 512, oil 514, upper electrode 516 and lower electrode 518 which may correspond to the first layer 402, second layer 404, barrier 406, sealant 408, elongated electrodes 410A, 410B, liquid solution 414, oil 416, upper electrode 418 and lower electrode 420 of FIGS. 4A-4B.

Figure 5A:
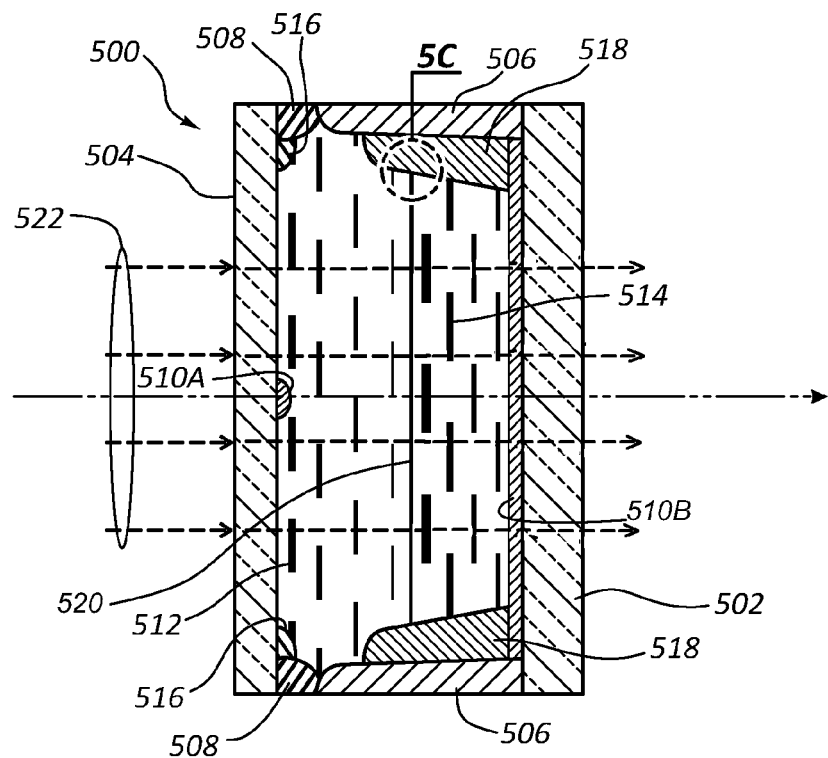
FIGS. 5A-5D depict a principle of operation of an individual cell that may be included in the first layer of FIGS. 4A-4B.

FIG. 5A may illustrate a configuration of the individual cell 500 that may exist in the absence of an applied voltage across the individual cell 500. In particular, a surface boundary 520 between the liquid solution 512 and oil 514 may be substantially planar such that incoming optical rays 522 transmitted through individual cell 500 are focused at infinity.

Figure 5B:
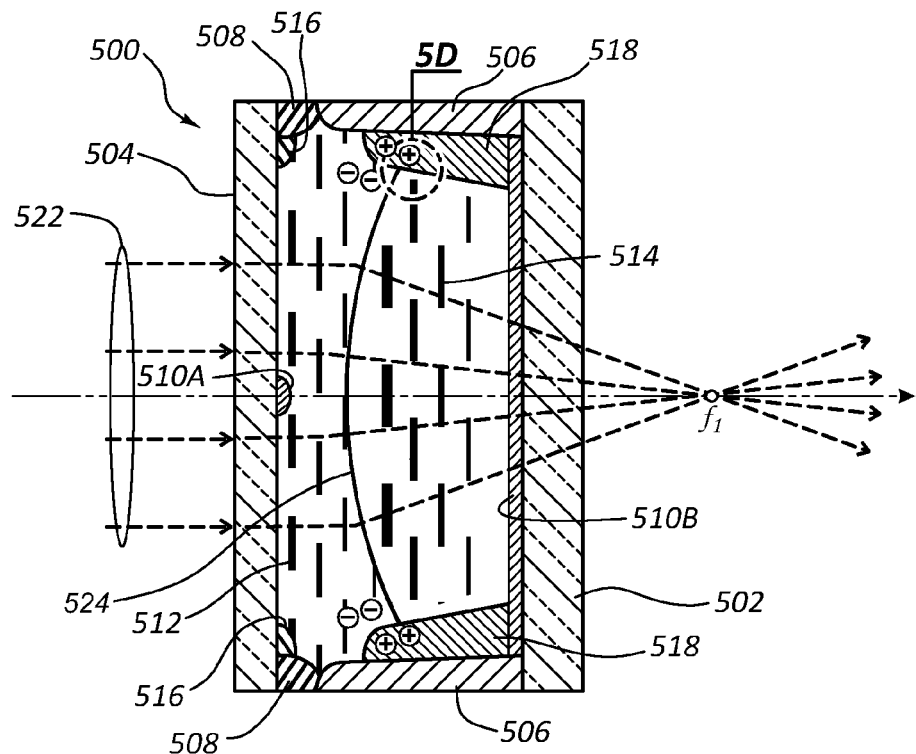

Alternately or additionally, FIG. 5B may illustrate a configuration of the individual cell 500 that may exist in the presence of an applied voltage across the individual cell 500. In particular, a surface boundary 524 between the liquid solution 512 and oil 514 may be curved such that incoming optical rays 522 transmitted through individual cell 500 are focused at focal length $f_1$.

Figure 5C:
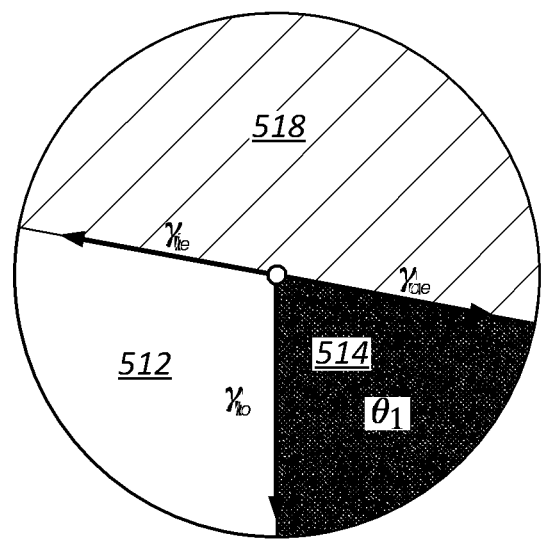
Figure 5D:
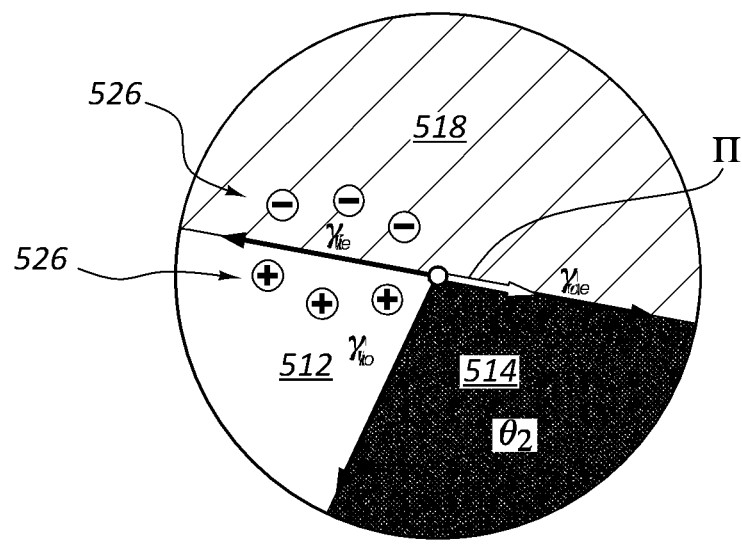

FIGS. 5C and 5D may illustrate blowup views corresponding to reference circles 5C and 5D of FIGS. 5A and 5B, respectively. According to some embodiments, three interfacial tensions may occur inside the individual cell 500, including tension $\gamma_{le}$ between the liquid solution 512 and the lower electrode 518, tension $\gamma_{oe}$ between the oil 514 and the lower electrode 518, and tension $\gamma_{lo}$ between the liquid solution 512 and the oil 514.

Based on the Young-Laplace equation, the following relationship may exist between tensions $\gamma_{le}$, $\gamma_{oe}$ and $\gamma_{lo}$ and a contact angle $\theta_1$ formed between the lower electrode 518 and the oil 514 when no voltage is applied: $\cos\theta_1 = (\gamma_{1e} - \gamma_{oe})/\gamma_{lo}$ (see FIG. 5C).

If a voltage is applied, the boundary surface may be subjected to a pressure $\Pi$ caused by electric charges 526. The pressure $\Pi$ can be expressed as $\frac{1}{2}(\in\cdot\in 0)/c\,V^2$, where $\in$ is the permittivity of the barrier 506, $\in 0$ is the dielectric constant, e is a thickness of the bather 506, and V is a magnitude of the applied voltage. When a voltage is applied across the individual cell as depicted in FIG. 5D, the following relationship may exist between tensions $\gamma_{le}$, $\gamma_{oe}$ and $\gamma_{lo}$ and a contact angle $\theta_2$ formed between the lower electrode 518 and the oil 514: $\cos\theta_1 = (\gamma_{le} - \gamma_{oe})/\gamma_{lo} - \frac{1}{2}(\in\cdot\in 0)/e\,V^2$.

In the embodiments of FIGS. 4A-5D, the liquid lens units 210 of the first layer 202 of FIGS. 2A-2B may be electrically-actuated. Alternately or additionally, the liquid lens units 210 may be pneumatically-actuated as described with respect to FIGS. 6A-6B.

Figure 6A:
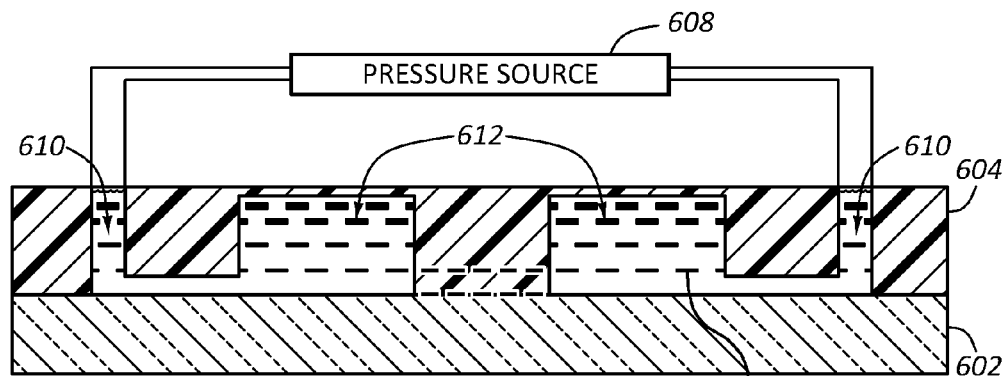
FIGS. 6A-6B are cross-sectional side views of an alternative embodiment of the first layer included in the assembly of FIG. 2A.
Figure 6B:
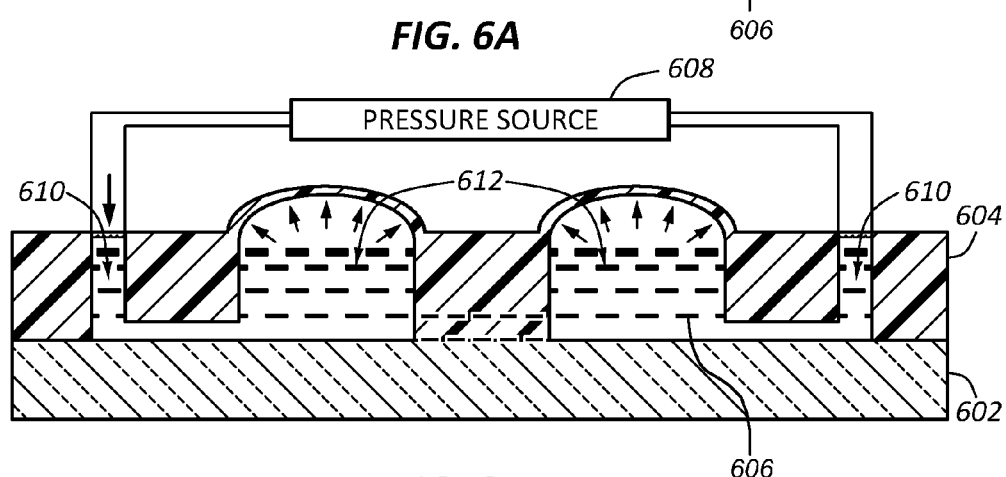

FIGS. 6A and 6B show cross-sectional side views of an alternative embodiment of the first layer 202 included in the assembly 108 of FIG. 2A that is arranged in accordance with at least some embodiments described herein. With combined reference to FIGS. 6A-6B, the first layer 202 may include a substrate 602, a membrane 604 bonded to the substrate 602, a liquid 606 and a pressure source 608.

Each of the substrate 602 and membrane 604 may be substantially transparent to optical rays having wavelengths within one or more predetermined wavelength ranges. For example, each of the substrate 602 and membrane 604 may have an optical transmittance of greater than about 85%, or greater than about 90%, or greater than about 95% with respect to at least the predetermined wavelength range. The predetermined wavelength range may include the visible spectrum. Alternately or additionally, the predetermined wavelength range may include a subrange of the visible spectrum. Moreover, the substrate 602 may include one or more of glass, poly(methyl methacrylate), acrylic resin, polycarbonate, fluorocarbon polymers, Cycloc Olefin Copolymer ("COC"), or other suitable optically transparent material(s). Alternately or additionally, the membrane 604 may include polydimethyl-siloxane ("PDMS") elastomer, or other suitable flexible optically transparent material(s).

The membrane 604 may be adapted to define a multiple number of micro-fluidic channels 610 and a multiple number of deformable cells 612. The deformable cells 612 may correspond to the liquid lens units 210. Each of the micro-fluidic channels 610 may be configured in fluid communication with one or more of the deformable cells 612.

The liquid 606 may be contained within each of the deformable cells 612 and/or the micro-fluidic channels 610. The liquid 606 may be any liquid whose index of refraction is greater than or equal to an index of refraction of the membrane 604. The liquid 606 may include, for instance, water, silicon oil, paraffin oil, hydrocarbon liquid, fluorinated hydrocarbon, or the like.

The pressure source 608 may be arranged in fluid communication with the micro-fluidic channels 610. The pressure source 608 may be configured to selectively pressurize one or more of the deformable cells 612 using the liquid 606 to adjust a focal length of the corresponding one or more of the deformable cells 612 between the focal range $f_{min}$ to $f_{max}$.

In the embodiment of FIG. 6A, a pressure of the liquid 606 within the deformable cells 612 may be selected such that the deformable cells 612 are configured to focus incoming optical rays at infinity. Alternately or additionally, in the embodiment of FIG. 6B, a pressure of the liquid 606 within the deformable cells 612 may be greater than a pressure of the liquid 606 in FIG. 6A such that the deformable cells 612 may be configured to focus incoming optical rays at a finite focal length.

Figure 7:
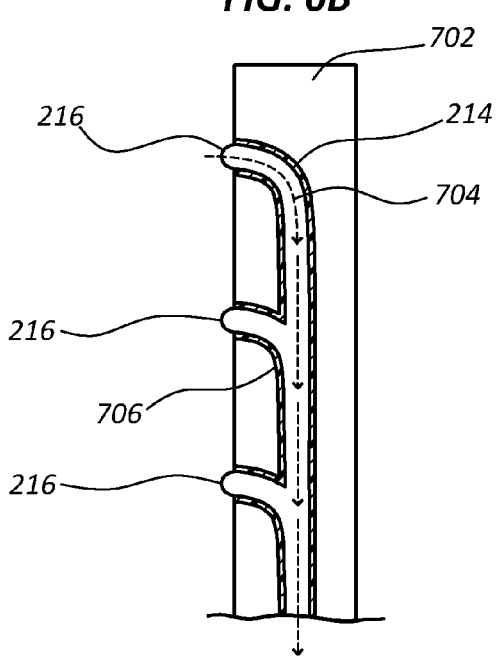
FIG. 7 is a cross-sectional side view of an illustrative embodiment of a second layer included in the assembly of FIG. 2A.

FIG. 7 show a cross-sectional side view of an illustrative embodiment of the second layer 204 included in the assembly 108 of FIG. 2A that is arranged in accordance with at least some embodiments described herein. As previously noted, the second layer 204 may include multiple optical waveguides 214 and each waveguide may include multiple waveguide inlets 216 and one or more waveguide outlets 220 (FIG. 2A). The optical waveguides 214 may include one or more of glass, quartz, poly(methyl methacrylate), fluorinated polyimide, epoxy resin, COC, polycarbonate, or other suitable material(s).

The second layer 204 may further include an optically transmissive substrate 702. The optically transmissive substrate 702 may be overmolded over a portion of the optical waveguides 214 excluding the waveguide inlets 216, the waveguide outlets 220, or both. In some embodiments, the optically transmissive substrate 702 may be configured to transmit incoming optical rays transmitted through the first layer 202 (FIG. 2A) that may be incident on the optically transmissive substrate 702.

Accordingly, the optically transmissive substrate 702 may be substantially transparent to optical rays having wavelengths within one or more predetermined wavelength ranges. For example, the optically transmissive substrate 702 may have an optical transmittance of greater than about 85%, or greater than about 90%, or greater than about 95% with respect to at least the predetermined wavelength range. The predetermined wavelength range may include the visible spectrum. Alternately or additionally, the predetermined wavelength range may include a subrange of the visible spectrum. The optically transmissive substrate 702 may include one or more of glass, quartz, poly(methyl methacrylate), fluorinated polyimide, epoxy resin, COC, or polycarbonate.

The optically transmissive substrate 702 may have an index of refraction that is lower than an index of refraction of the optical waveguides 214 such that optical rays 704 received into the optical waveguides 214 by waveguide inlets 216 may be substantially confined within the optical waveguides 214 by total internal reflection.

Optionally, the second layer 204 may further include a plating film 706 between the optical waveguides 214 and the optically transmissive substrate 702. The plating film 706 may be configured to substantially prevent the optical rays 704 from leaking out of the optical waveguides 214. The plating film 706 may include one or more of nickel, silver, gold, copper or other suitable material(s).

In some embodiments, the second layer 204 may be formed by first forming the optical waveguides 214 including waveguide inlets 216 and waveguide outlets 220, electroplating the optical waveguides 214 with the plating film 214, and overmolding the optically transmissive substrate 702 over the plating film 706 on the optical waveguides 214 excluding the waveguide inlets 216 and waveguide outlets 220. Alternately or additionally, the plating film 706 may be removed from the waveguide inlets 216 and waveguide outlets 220 before overmolding the optically transmissive substrate 702.

The waveguide inlets 216 may have any configuration suitable for receiving optical rays incident thereon into the corresponding optical waveguide 214. For instance, the waveguide inlets 216 may have a substantially convex shape as illustrated in FIG. 7. Japanese Unexamined Patent Application Publication 2005-164631, filed Nov. 28, 2003, discloses aspects of photo-detection portions 102 coupled to a branch-shaped light guide portion 103, which may also be applied to the waveguide inlets 216 disclosed in the present application. The foregoing reference is incorporated herein by reference in its entirety for all purposes.

In some embodiments disclosed herein, the optical waveguides 214 have a branch structure including multiple branches coupling each waveguide inlet 216 to the corresponding optical waveguide 214. To substantially reduce loss in the optical waveguides 214 that might otherwise arise due to the branching structure of the optical waveguides 214, the optical waveguides 214 may have any suitable configuration. Japanese Patent No. 4171565, filed Dec. 16, 1999, discloses aspects of a branched waveguide which may also be applied to the optical waveguides 214 disclosed in the present application. The foregoing reference is incorporated herein by reference in its entirety for all purposes.

Figure 8A:
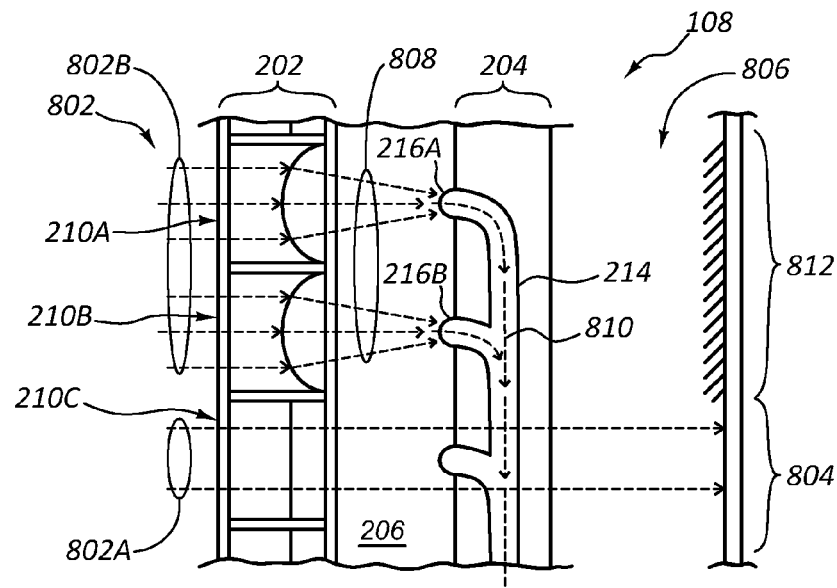
FIGS. 8A-8C illustrate some example operating modes of the assembly of FIG. 2A.
Figure 8A:
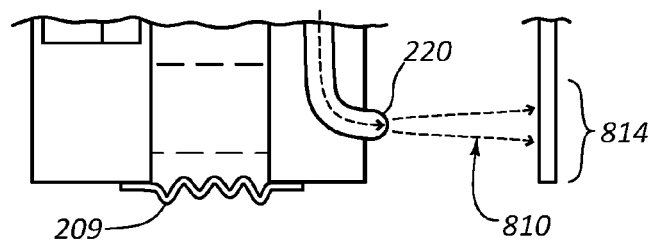
Figure 8B:
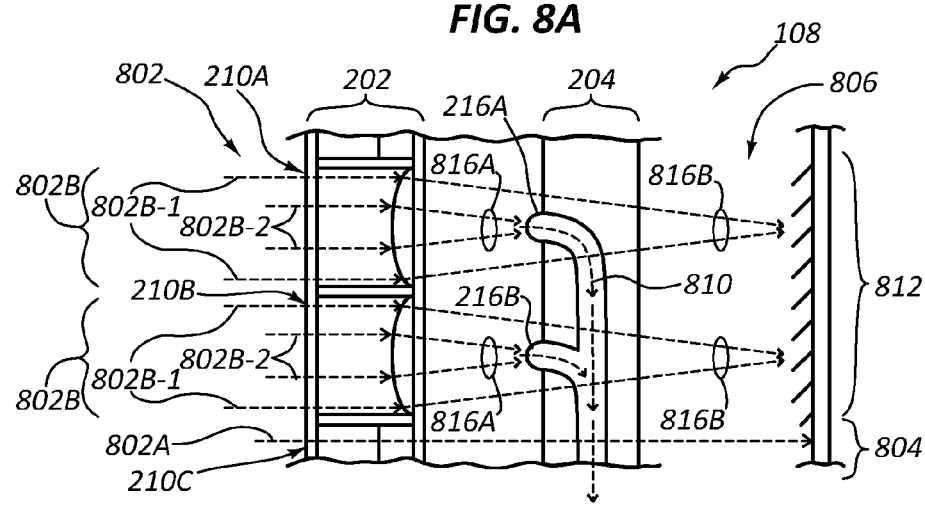
Figure 8B:
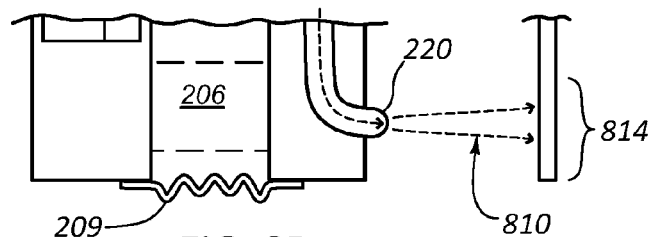
Figure 8C:
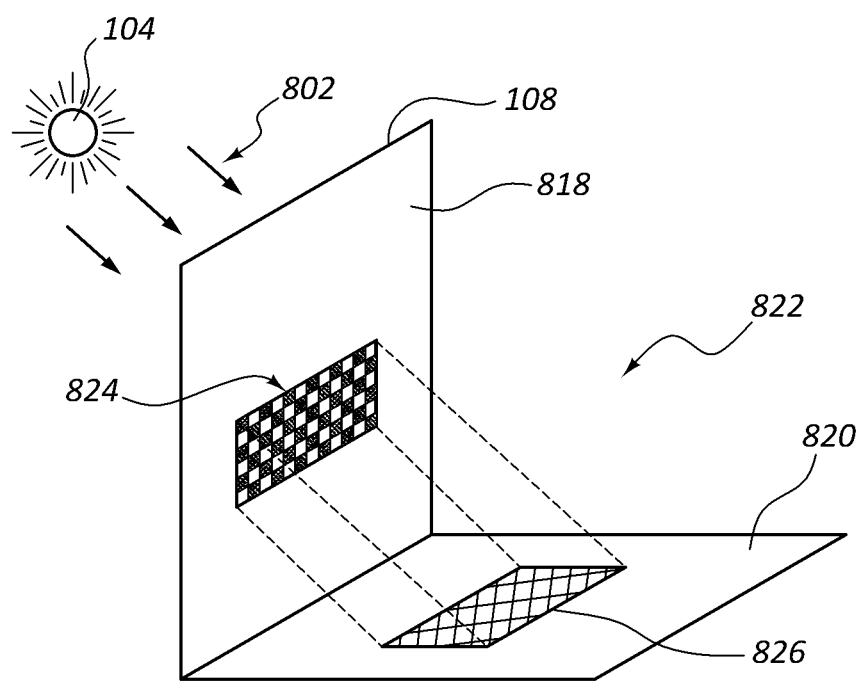

FIGS. 8A-8C illustrate some example operating modes of the assembly 108 of FIG. 2A, arranged in accordance with at least some embodiments described herein. In the embodiment of FIG. 8A, incoming optical rays 802 may be received at the assembly 108. A first portion 802A of the incoming optical rays 802 may be received by a first portion of the assembly 108 corresponding to liquid lens unit 210C. The liquid lens unit 210C may be configured with a focus at infinity such that the first portion 802A of the incoming optical rays 802 transmitted through the liquid lens unit 210C may be further transmitted through the second layer 204 to illuminate a first portion 804 of an interior space 806.

A second portion 802B of the incoming optical rays 802 may be received by a second portion of the assembly 108 corresponding to liquid lens units 210A and 210B. Each of the liquid lens units 210A, 210B may be configured with a focus at the first focal length $f_1$ which may be at the waveguide inlets 216A, 216B. Accordingly, the second portion 802B of incoming optical rays 802 transmitted through the first layer 202 may be focused onto waveguide inlets 216A, 216B as focused optical rays 808. The focused optical rays 808 may be received by waveguide inlets 216A, 216B into the optical waveguide 214 as redirected optical rays 810 and blocked from illuminating a second portion 812 of the interior space 806. Optionally, the redirected optical rays 810 may be output by the waveguide outlet 220 to illuminate a third portion 814 of the interior space 806.

FIG. 8B may be similar in some respects to FIG. 8A. For instance, the first portion 802A of the incoming optical rays 802 may be received by the first portion of the assembly 108 corresponding to liquid lens unit 210C. The liquid lens unit 210C may be configured with a focus at infinity such that the first portion 802A of the incoming optical rays 802 transmitted through the liquid lens unit 210C may be further transmitted through the assembly 108 to illuminate a first portion 804 of an interior space 806.

The second portion 802B of the incoming optical rays 802 may be received by the second portion of the assembly 108 corresponding to liquid lens units 210A and 210B. Each of the liquid lens units 210A, 210B may be configured with a focus at the third focal length $f_3$ which may be beyond the waveguide inlets 216A, 216B. Accordingly, a first part 802B-1 of the second portion 802B of incoming optical rays 802 transmitted through the first layer 202 may be focused onto waveguide inlets 216A, 216B as first defocused optical rays 816A, while a second part 802B-2 of the second portion 802B of incoming optical rays 802 transmitted through the first layer 202 may be further transmitted through the second layer 204 as second defocused optical rays 816B.

In the illustrative embodiment of FIG. 8B, the first defocused optical rays 816A may be blocked from illuminating the second portion 812 of interior space 806, while the second defocused optical rays 816B may illuminate the second portion 812 of the interior space 806. Thus, the configuration of the assembly 108 of FIG. 8B may partially block incoming optical rays 802B from illuminating the second portion 812 of interior space 806.

The first defocused optical rays 816A may be received by waveguide inlets 216A, 216B into the optical waveguide 214 as redirected optical rays 810. Optionally, the redirected optical rays 810 may be output by the waveguide outlet 220 to illuminate the third portion 814 of the interior space 806.

Although the third portion 814 of the interior space 806 in FIGS. 8A and 8B is illustrated as being separate from the first portion 804 and second portion 812 of the interior space 806, in other embodiments the first and third portions 804, 814 of the interior space 806 may overlap in some manner. For instance, the first portion 804 may include all or a part of the third portion 814, or the third portion 814 may include all or a part of the first portion 804.

Alternately or additionally, the second and third portions 812, 814 may overlap in some manner. In embodiments where the third portion 814 illuminated by redirected optical rays 810 overlaps the second portion 812 in some manner, the redirected optical rays 810 may be output to the interior space 806 in such a manner that the redirected optical rays 810 may be incident on the second portion 812 of the interior space at a different angle than optical rays that are transmitted through the assembly 108 without being redirected by the assembly 108. For instance, the second portion 812 of the interior space 806 may include a user workstation where any incoming optical rays 802 transmitted through the assembly 108 without being redirected might create glare on the user workstation due to the incidence angle of the incoming optical rays 802. While the third portion 814 of interior space 806 may also include the user workstation, the waveguide outlet 220 may be configured to output redirected optical rays 810 from above the user workstation to provide illumination on the user workstation without creating glare on the user workstation.

FIG. 8B illustrates an example configuration of the assembly 108 adapted to partially block incoming optical rays 802 by defocusing one or more of the liquid lens units 210. Alternately or additionally, incoming optical rays 802 may be partially blocked by reducing an actuation frequency of the liquid lens units 210 within a given portion of the assembly 108 as illustrated in FIG. 8C.

In the illustrative embodiment of FIG. 8C, a first portion (not labeled) of incoming optical rays 802 may be received by a first portion 818 of the assembly 108. The liquid lens units (not shown in FIG. 8C) of the first portion 818 of the assembly 108 may be configured with a focus at infinity such that the first portion of the incoming optical rays 802 may be transmitted through the assembly 108 to illuminate a first portion 820 of an interior space 822.

A second portion (not labeled) of incoming optical rays 802 may be received by a second portion 824 of the assembly 108. Some of the liquid lens units (not shown in FIG. 8C) of the second portion 824 of the assembly 108 may be configured with a focus at infinity, while others of the liquid lens units of the second portion 824 may be configured with a focus at the first focal length $f_1$ which may be at the waveguide inlets (not shown in FIG. 8C). As illustrated in FIG. 8C, the liquid lens units in the second portion 824 configured with a focus at infinity may, for instance, alternate in a checkerboard pattern with the liquid lens units in the second portion 824 configured with a focus at the first focal length $f_1$.

Accordingly, a first part of the second portion of incoming optical rays 802 transmitted through the liquid lens units of the second portion 824 that are configured with a focus at infinity may also be transmitted through the second layer (not shown in FIG. 8C) of the assembly 108 to a second portion 826 of the interior space 822. In contrast, a second part of the second portion of incoming optical rays 802 transmitted through the liquid lens units of the second portion 824 that are configured with a focus at the first focal length $f_1$ may be focused onto corresponding waveguide inlets (not shown in FIG. 8C), received into corresponding waveguides and redirected to a different portion of the interior space 822. Thus, the configuration of the assembly 108 described with respect to FIG. 8C may partially block incoming optical rays 802 from illuminating the second portion 826 of the interior space 822.

Figure 9:
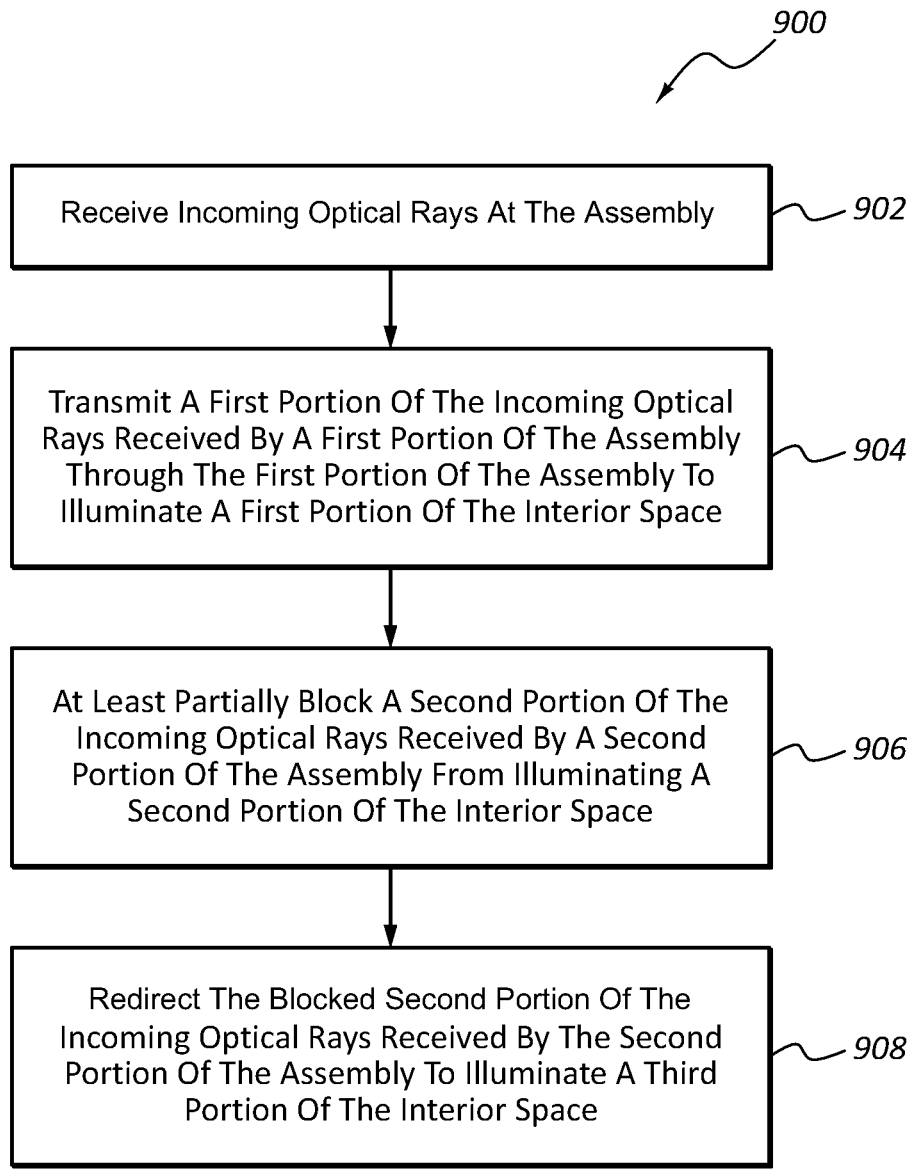
FIG. 9 shows an example flow diagram of a method of operating an assembly with selective optical transmissivity, all arranged in accordance with at least some embodiments described herein.

FIG. 9 shows an example flow diagram of a method 900 of operating an assembly with selective optical transmissivity, arranged in accordance with at least some embodiments described herein. The assembly may correspond to the assembly 108 described herein. Accordingly, the assembly may include a first layer including an array of liquid lens units, and a second layer spaced apart from the first layer. The second layer may include a multiple number of optical waveguides. Each of the optical waveguides may include a multiple number of waveguide inlets. Each of the waveguide inlets may correspond to a different liquid lens unit included in the array of liquid lens units. The method 900 includes various operations, functions or actions as illustrated by one or more of blocks 902, 904, 906 and/or 908. The method 900 may begin at block 902.

In block 902, ["Receive Incoming Optical Rays At The Assembly"], incoming optical rays may be received at the assembly. The incoming optical rays may be received directly from a source such as the sun or a streetlight, or the incoming optical rays may be received indirectly from a source via reflection off of a reflective surface on a neighboring building, house, or other structure, or body of water, or the like. Block 902 may be followed by block 904.

In block 904, ["Transmit A First Portion Of The Incoming Optical Rays Received By A First Portion Of The Assembly Through The First Portion Of The Assembly To Illuminate A First Portion Of the Interior Space"], a first portion of the incoming optical rays received by a first portion of the assembly may be transmitted through the first portion of the assembly to illuminate a first portion of the interior space. The first portion of the assembly may include liquid lens units in a corresponding first layer of the assembly that are configured with a focus at a focal length beyond a corresponding second layer of the assembly, such as a focal length of infinity. Accordingly, at least some of the first portion of the incoming optical rays received by the first portion of the assembly may be transmitted through both the first and second layers of the assembly to illuminate the first portion of the interior space. Block 904 may be followed by block 906.

In block 906, ["At Least Partially Block A Second Portion Of The Incoming Optical Rays Received By A Second Portion Of The Assembly From Illuminating A Second Portion Of The Interior Space"], a second portion of the incoming optical rays received by a second portion of the assembly may be at least partially blocked from illuminating a second portion of the interior space.

In some embodiments, at least partially blocking 906 the second portion of the plurality of incoming optical rays may include focusing a subset of the array of liquid lens units that corresponds to the second portion of the assembly such that incoming optical rays received by the second portion of the assembly are focused on and received by respective ones of the waveguide inlets and thereby blocked from illuminating the second portion of the interior space. The foregoing configuration of the assembly may correspond to the configuration of FIG. 8A in which liquid lens units 210A, 210B may be configured with a focus at the first focal length $f_1$ so as to focus the second portion 802B of incoming optical rays 802 on waveguide inlets 216A, 216B.

Alternately or additionally, at least partially blocking 906 the second portion of the plurality of incoming optical rays may include focusing a subset of the array of liquid lens units corresponding to the second portion of the assembly such that a first part of the second portion of the incoming optical rays may be directed onto and received by respective ones of the waveguide inlets, while a second part of the second portion of the incoming optical rays may be directed around the respective ones of the waveguide inlets and transmitted through the second layer. The foregoing configuration of the assembly may correspond to the configuration of FIG. 8B in which liquid lens units 210A, 210B may be configured with a focus at the third focal length $f_3$ such that the first part 802B-1 of the second portion 802B of incoming optical rays 802 may be transmitted through the second layer 204 as defocused optical rays 816B, while the second part 802B-2 of the second portion 802B of incoming optical rays 802 may be directed onto and received by waveguide inlets 216A, 216B as defocused optical rays 816A.

Alternately or additionally, at least partially blocking 906 the second portion of the plurality of incoming optical rays may include focusing some, but not all, of a subset of liquid lens units corresponding to the second portion of the assembly such that some of the second portion of incoming optical rays are focused on and received by corresponding waveguide inlets while others of the second portion of incoming optical rays are transmitted through the assembly into the interior space. The foregoing configuration of the assembly may correspond to the configuration of FIG. 8C in which liquid lens units in the second portion 824 of the assembly 108 configured with a focus at infinity may alternate in a checkerboard pattern with liquid lens units in the second portion 824 of the assembly 108 configured with a focus at the first focal length $f_1$.

According to some embodiments, focusing a subset of liquid lens units or some, but not all, of a subset of liquid lens units may include pressurizing a multiple number of liquid-filled deformable cells corresponding to the subset of liquid lens units, or the some, but not all, of the subset of liquid lens units. Alternately or additionally, focusing a subset of liquid lens units or some, but not all, of a subset of liquid lens units may include applying an electric field across a multiple number of individual cells to modify a surface boundary between liquid and oil contained with each of the individual cells, where the individual cells may correspond to the subset of liquid lens units, or the some, but not all, of the subset of liquid lens units.

Returning to FIG. 9, block 906 may be followed by block 908. In block 908, ["Redirect The Blocked Second Portion Of The Incoming Optical Rays Received By The Second Portion Of The Assembly To Illuminate A Third Portion Of The Interior Space"], the blocked second portion of incoming optical rays received by the second portion of the assembly may be redirected to illuminate a third portion of the interior space. For instance, FIG. 1 illustrates an example of redirected optical rays 114, and FIGS. 8A and 8B illustrate examples of redirected optical rays 810.

In some embodiments, redirecting 908 the blocked second portion of the incoming optical rays may include directing incoming optical rays focused onto and received by corresponding waveguide inlets through one or more corresponding optical waveguides to one or more optical ray output devices in the interior space.

In light of the present disclosure, it will be appreciated that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, other functions and operations not shown in FIG. 9 or described above can be included in the method 900. As an example, the method 900 may further include adjusting a relative alignment between the first and second layer of the assembly to accommodate a change in an incidence angle of the incoming optical rays arising from relative movement between a source of the incoming optical rays and the assembly. The relative alignment may be adjusted periodically in some embodiments. The adjustments may be pre-programmed and controlled by a control module, such as the control module 122 of the assembly 108 of FIG. 1, where the control module may adjust relative alignment through an XY stage, such as the XY stage 208 of FIG. 2A.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An assembly with selective optical transmissivity, the assembly comprising:
   a first layer including a plurality of liquid lens units,
   wherein each of the plurality of liquid lens units has a first state configured to selectively focus incoming optical rays within a focal range defined between a first focal length and a second focal length; and
   a second layer spaced apart from the first layer, wherein:
      the second layer includes a plurality of optical waveguides;
      each of the plurality of optical waveguides includes one or more waveguide inlets such that the second layer includes a plurality of waveguide inlets;
      an optically transmissive substrate supporting the plurality of optical waveguides; and
      each of the plurality of waveguides inlets is associated with a respective one of the plurality of liquid lens units and is spaced apart from the respective one of the plurality of liquid lens units by a distance within the focal range such that the focused optical rays from the respective one of the plurality of liquid lens units are received by the associated waveguide inlet when the respective one of the plurality of liquid lens units is in the first state; and
   wherein each of the plurality of liquid lens units has a second state configured such that the incoming optical rays are directly transmitted through the liquid lens unit without focusing the incoming optical rays to within the focal range such that the incoming optical rays are not focused onto the associated waveguide inlets and are transmitted through the optically transmissive substrate.

2. The assembly of claim 1, wherein each of the plurality of waveguide inlets is configured to receive incoming optical rays focused by the respective one of the plurality of liquid lens units at a third focal length within the focal range and to direct the received optical rays into a respective one of the plurality of optical waveguides.

3. The assembly of claim 2, wherein each of the plurality of waveguide inlets is configured to receive a portion of incoming optical rays focused by the respective one of the plurality of liquid lens units at a fourth focal length within the focal range and also configured to direct the received portion of incoming optical rays into the respective one of the plurality of optical waveguides, wherein the fourth focal length is greater than the third focal length.

4. The assembly of claim 1, wherein the optically transmissive substrate includes one or more of glass, quartz, poly (methyl methacrylate), fluorinated polyimide, epoxy resin, Cyclic Olefin Copolymer, or polycarbonate.

5. The assembly of claim 1, wherein the second layer further includes an electro-plated film positioned between the plurality of optical waveguides and the optically transmissive substrate.

6. The assembly of claim 1, wherein the incoming optical rays directly transmitted through the liquid lens unit are substantially unaffected by the liquid lens unit in the second state.

7. The assembly of claim 1, wherein the first layer comprises:
a first film;
a second film spaced apart from the first film;
a plurality of non-conductive barriers extending from the first film into a region between the first and second films, the plurality of non-conductive barriers defining a plurality of individual cells corresponding to respective ones of the plurality of liquid lens units;
a liquid solution and oil positioned within each of the plurality of individual cells, wherein a surface boundary between the liquid solution and the oil is substantially curved in the first state and is substantially planar in the second state;
a sealant positioned to form a seal between the plurality of non-conductive barriers and the second film; and
a plurality of elongated electrodes including a first subset positioned on the first film and a second subset positioned on the second film and aligned orthogonally to the first subset, wherein the elongated electrodes of the first subset extend between and terminate at opposing sidewalls of the non-conductive barriers of the plurality.

8. The assembly of claim 7, wherein each of the plurality of elongated electrodes includes one or more of indium tin oxide, zinc oxide, aluminum zinc oxide, strontium oxide, silver, gold, copper, aluminum, beryllium, magnesium, sodium, calcium, zinc, molybdenum, tungsten, iridium, rhodium, potassium, nickel, chromium, cobalt, osmium, lithium, iron, polyaniline, polythiophene, polyacetylene, polyphenylene, polypyrrole, carbon nanotubes, fullerene, or diamond-like carbon.

9. The assembly of claim 7, wherein the sealant includes one or more of an ultraviolet ("UV") thermosetting epoxy resin, a UV thermosetting acrylic resin, a thermosetting silicone resin, or a mixture-setting silicone resin.

10. The assembly of claim 7, wherein the plurality of barriers include silicone rubber, polyurethane rubber, isobutylene-isoprene rubber, acrylic resin, epoxy resin, or polyurethane resin.

11. The assembly of claim 7, wherein each of the first and second films includes one or more of glass, poly(methyl methacrylate), acrylic resin, polycarbonate, fluorocarbon polymers, or Cyclic Olefin Copolymer.

12. The assembly of claim 7, wherein the liquid solution includes one or more of LiCl, $Na_2SO_4$, $Li_2SO_4$, NaCl, $CaCl_2$, $CaSO_4$, $MgCl_2$, or $MgSO_4$.

13. The assembly of claim 7, wherein the oil includes one or more of phenylmethylsiloxanes, carbon tetrabromide, 1-bromo-dodecane, chloro-naphtalene, bromo-naphtalene, or silicon oil.

14. The assembly of claim 7, further comprising upper electrodes and lower electrodes, the upper electrodes positioned adjacent to the sealant and the lower electrodes extending from the first film into a region between the first and second films and positioned adjacent the non-conductive barriers, wherein surfaces of the plurality of elongated electrodes, the upper electrodes, and lower electrodes are exposed within a void within each of the individual cells.

15. The assembly of claim 1, wherein the first layer comprises:
a glass substrate;
a membrane bonded to the glass substrate, the membrane defining a plurality of micro-fluidic channels and a plurality of deformable cells corresponding to respective ones of the plurality of liquid lens units, wherein each of the plurality of micro-fluidic channels is in fluid communication with one or more of the plurality of deformable cells;
a liquid contained within each of the plurality of deformable cells; and
a pressure source adapted in fluid communication with the plurality of micro-fluidic channels, wherein the pressure source is configured to selectively pressurize one or more of the plurality of deformable cells using the liquid to adjust a focal length of the corresponding one or more liquid lens units.

16. The assembly of claim 1, further comprising a control module operably coupled to each of the liquid lens units of the plurality and configured to independently control one or more of the plurality of liquid lens units to be at the first state or second state.

17. An assembly with selective optical transmissivity, the assembly comprising:
a first layer including an array of liquid lens units,
wherein each of the plurality of liquid lens units has a first state configured to selectively focus incoming optical rays to a focal length within a focal range defined between a first focal length and a second focal length;
a second layer spaced apart from the first layer, wherein:
the second layer includes a plurality of optical waveguides;
each of the plurality of optical waveguides includes one or more waveguide inlets such that the second layer includes a plurality of waveguide inlets;
an optically transmissive substrate supporting the plurality of optical waveguides; and
each of the plurality of waveguide inlets is associated with a respective liquid lens unit included in the array of liquid lens units and is spaced apart from the respective liquid lens unit by a distance within the focal range such that the incoming optical rays are focused onto the associated waveguide inlets by the respective liquid lens unit in the first state; and
a buffer layer positioned between the first and second layers,
wherein each of the plurality of liquid lens units has a second state configured such that the incoming optical rays are directly transmitted through the liquid lens unit without focusing the incoming optical rays to within the focal range such that the incoming optical rays are not focused onto the associated waveguide inlets and are transmitted through the optically transmissive substrate.

18. The assembly of claim 17, wherein the buffer layer comprises one or more of silicon oil, water, paraffin oil, hydrocarbon liquid, and fluorinated hydrocarbon.

19. The assembly of claim 17, wherein:
the buffer layer has an index of refraction between an index of refraction of the array of liquid lens units and an index of refraction of the plurality of optical waveguides; or
the buffer layer has an index of refraction that is no more than about 10% higher than an index of refraction of the array of liquid lens units or an index of refraction of the plurality of optical waveguides, whichever is higher; or
the buffer layer has an index of refraction that is no more than about 10% lower than an index of refraction of the array of liquid lens units or an index of refraction of the plurality of optical waveguides, whichever is lower.

20. The assembly of claim 17, wherein the array of liquid lens units includes columns of liquid lens units and each of the plurality of optical waveguides is aligned with a respective column of liquid lens units, further wherein a diameter of each of the plurality of optical waveguides is less than about 10 percent of a width of a corresponding column of liquid lens units.

21. The assembly of claim 17, wherein each of the plurality of optical waveguides includes a waveguide outlet configured to output optical rays received by one or more waveguide inlets and directed through a respective optical waveguide to a respective waveguide outlet.

22. The assembly of claim 21, wherein the assembly is configured to be set in an opening within a ceiling or wall of a room to control lighting in the room and further comprises a light guide set in the ceiling or wall of the room, wherein the light guide is coupled to one or more of the waveguide outlets and wherein the light guide is configured to diffusely output optical rays received from the one or more of the waveguide outlets into the room.

23. The assembly of claim 17, further comprising:
a plurality of optical ray output devices respectively positioned in a plurality of locations of the room; and
an optical switch coupled between the plurality of optical waveguides and the plurality of optical ray output devices, wherein the optical switch is configured to selectively direct optical rays received from the plurality of optical waveguides to the plurality of optical ray output devices.

24. The assembly of claim 17, wherein each of the plurality of waveguides includes one or more of glass, quartz, poly (methyl methacrylate), fluorinated polyimide, epoxy resin, Cylcic Olefin Copolymer, or polycarbonate.

25. The assembly of claim 17, further comprising an XY stage coupled between the first layer and the second layer.

26. The assembly of claim 25, wherein the XY stage is configured to maintain a predetermined spacing between the first layer and the second layer and is configured to adjust an alignment of one of the first layer or the second layer relative to the other of the second layer or the first layer.

27. A method of operating an assembly with selective optical transmissivity, the method comprising:
receiving a plurality of incoming optical rays at a first layer of the assembly including a plurality of liquid lens units;
configuring a first portion of the plurality of liquid lens units to selectively focus the incoming optical rays within a focal range defined between a first focal length and a second focal length;
configuring a second portion of the plurality of liquid lens units such that the incoming optical rays are directly transmitted through the second portion of the plurality of liquid lens units without focusing to the focal range;
focusing a first portion of the plurality of incoming optical rays received by the first portion of the plurality of liquid lens units so as to be received by one or more waveguide inlets of a first portion of a plurality of waveguides spaced apart from the plurality of liquid lens units by a distance within the focal range and to at least partially block the first portion of the plurality of incoming optical rays from illuminating a first portion of an interior space; and
transmitting a second portion of the plurality of incoming optical rays received by the second portion of the plurality of liquid lens units without focusing to the focal range such that the second potion of the plurality of incoming optical rays are not focused onto one or more waveguide inlets of a second portion of the plurality of waveguides so that the second portion of the plurality of incoming optical rays illuminate a second portion of the interior space, wherein the first portion of the plurality of waveguides emit the first portion of the plurality of incoming optical rays from one or more waveguide outlets so as to illuminate a third portion of the interior space.

28. The method of claim 27, directing the first portion of the plurality of incoming optical rays emitted from the one or more waveguide outlets of the first portion of the plurality of optical waveguides to one or more optical ray output devices in the interior space so as to illuminate the third portion of the interior.

29. The method of claim 27, wherein configuring the first portion of the plurality of the liquid lens units includes:
pressurizing a plurality of liquid-filled deformable cells; or
applying an electric field across a plurality of individual cells to modify a surface boundary between liquid and oil contained within each of the plurality of individual cells from a substantially planar configuration to a substantially curved configuration.

30. The method of claim 27, wherein focusing the first portion of the plurality of incoming optical rays includes focusing a subset of the plurality of liquid lens units such that:
a first part of the first portion of the plurality of incoming optical rays is directed onto and received by respective ones of the plurality of waveguide inlets; and
a second part of the first portion of the plurality of incoming optical rays is directed around the respective ones of the plurality of waveguide inlets and transmitted through a second layer of the assembly having the plurality of waveguide inlets.

31. The method of claim 27, further comprising periodically adjusting a relative alignment between the first layer and the one or more waveguide inlets of the first portion of the plurality of waveguides to accommodate a change in an incidence angle of the plurality of incoming optical rays arising from relative movement between a source of the plurality of incoming optical rays and the assembly.

* * * * *

UNITED STATES PATENT AND TRADEMARK OFFICE
CERTIFICATE OF CORRECTION

| | | |
|---|---|---|
| PATENT NO. | : 8,811,781 B2 | Page 1 of 2 |
| APPLICATION NO. | : 13/143096 | |
| DATED | : August 19, 2014 | |
| INVENTOR(S) | : Kusuura | |

It is certified that error appears in the above-identified patent and that said Letters Patent is hereby corrected as shown below:

On Title Page 2, item (56), under "OTHER PUBLICATIONS", in Column 1, Line 5, delete "Liboratory." and insert -- Laboratory. --, therefor.

In the Specification,

In Column 4, Line 19, delete "20 configured" and insert -- configured --, therefor.

In Column 7, Line 60, delete "Cycloc" and insert -- Cyclic --, therefor.

In Column 8, Line 60, delete "chloro-naphtalene, bromo-naphtalene," and insert -- chloro-naphthalene, bromo-naphthalene, --, therefor.

In Column 10, Line 17, delete "$\cos\theta_1 = (\gamma_{1c} - \gamma_{oc})/\gamma_{lo}$" and insert -- $\cos\theta_1 = (\gamma_{le} - \gamma_{oe})/\gamma_{lo}$ --, therefor.

In Column 10, Line 21, delete "$\frac{1}{2}(\epsilon - \epsilon 0)/c V^2$." and insert -- $\frac{1}{2}(\epsilon \cdot \epsilon 0)/c V^2$ --, therefor.

In Column 10, Line 23, delete "bather" and insert -- barrier --, therefor.

In Column 10, Line 53, delete "Cycloc" and insert -- Cyclic --, therefor.

Signed and Sealed this
Sixth Day of January, 2015

Michelle K. Lee
*Deputy Director of the United States Patent and Trademark Office*

CERTIFICATE OF CORRECTION (continued)
U.S. Pat. No. 8,811,781 B2

In the Claims,

In Column 19, Line 52, in Claim 13, delete "chloro-naphtalene, bromo-naphtalene," and insert -- chloro-naphthalene, bromo-naphthalene, --, therefor.

In Column 21, Line 30, in Claim 24, delete "Cylcic" and insert -- Cyclic --, therefor.